(12) United States Patent
Baker

(10) Patent No.: US 7,657,926 B1
(45) Date of Patent: Feb. 2, 2010

(54) ENABLING NETWORK COMMUNICATION FROM ROLE BASED AUTHENTICATION

(75) Inventor: Steven T. Baker, Salt Lake City, UT (US)

(73) Assignee: 3Com Corporation, Marlborough, MA (US)

( * ) Notice: Subject to any disclaimer, the term of this patent is extended or adjusted under 35 U.S.C. 154(b) by 579 days.

(21) Appl. No.: 10/804,927

(22) Filed: Mar. 19, 2004

(51) Int. Cl.
*H04L 9/32* (2006.01)
(52) U.S. Cl. .......................................................... 726/2
(58) Field of Classification Search ........................ None
See application file for complete search history.

(56) References Cited

U.S. PATENT DOCUMENTS 6,393,474 B1 * 5/2002 Eichert et al. ............... 709/223
6,795,923 B1 * 9/2004 Stern et al. ..................... 726/12
6,938,154 B1 * 8/2005 Berson et al. ................ 713/156

* cited by examiner

Primary Examiner—Brandon S Hoffman

(57) ABSTRACT

Network communications are secured on clients that do not have a user properly logged in and authenticated. The clients have transmit and/or receive functionality disabled. When a user logs into the client and is properly authenticated, the transmit and/or receive functionality is enabled. In some embodiments, the client can then download firewall policy information to prevent the client from communicating on certain ports or with certain clients. The firewall policy information may be specific to a role that a user logged into the client has. For example, administrators, executives and employee roles may each use different firewall policy information.

6 Claims, 4 Drawing Sheets

ENABLING NETWORK COMMUNICATION FROM ROLE BASED AUTHENTICATION

BACKGROUND OF THE INVENTION

1. The Field of the Invention

The invention generally relates to the field of network security. More specifically, the invention relates to securing network traffic by preventing host devices from responding to queries until the host has been authenticated.

2. Description of the Related Art

A computer network allows data to be sent and received between computers on the network. Examples of data that may be shared within a network includes financial information, personal information, word processing data, etc. In addition, text, voice and multimedia data may be sent on a network. Networks have become common in many locations and varied in size. For example at the smaller level, many homes now include a home network for sharing multimedia and other data on the network. These networks are traditionally smaller including a relatively small number of connection points that are all in one location (i.e. the home). Smaller networks, such as those in homes, small businesses, and other localized venues, are commonly referred to as local area networks (LANs). At a larger level, many corporations and other large organizations have large networks with numerous connection points. Often the connection points are in a number of different locations up to and including connection points throughout the globe. Some networks allow users to connect from remote locations through an internet connection. Larger networks are often referred to as wide area networks (WANs).

Commonly, a network may be designed such that there are various tools for controlling access to the network and monitoring what computers are on a network. For example, each computer that is connected to a network has a network device such as a network interface card (NIC) installed on it. The network device may be in the form of, for example, a PCI card for desktop computers or a PCMCIA or CardBus card for laptops. Among other network interface devices are USB network adapters for desktop or laptop computers. Each network device has assigned to it a unique (for the particular network) IP address. In many cases, the unique IP addresses allows a network administrator or network hardware to decipher what computers are on the network. Also, the network can be configured such that certain IP addresses have certain restrictions. The restrictions can prevent certain types of data from traveling to and/or from certain IP addresses. An IP address is typically assigned by a software mechanism such that each network device can have the IP address assigned for the particular network on which the network device resides.

Each network device also has a unique media access control (MAC) address that is permanently assigned to the network device in the hardware of the network device. This MAC address can be used to control access to network resources as well. For example, some network resources can be controlled by restricting access to only MAC addresses that have been previously pre-approved for access to the specific resource.

Communications on networks often involve an authentication procedure. Before data is delivered to a computer, the computer requests the data. When a request for data is sent, the request may include the IP address or MAC address of the network device on which the computer sending the request is installed. A repository storing the data can check the IP or MAC address against a list of approved addresses, and if the IP or MAC address is on the approved list, the repository sends the requested data.

One challenge that arises in modem networking is maintaining appropriate security for the network. Most networks have sensitive data that needs to be protected. Financial institutions are especially concerned about protecting financial information to prevent theft and financial loss. Government agencies are interested in protecting military and other secret information. Corporations are interested in protecting trade secrets and other information. Even home users have an interest in protecting data on computers in a network to protect credit card numbers, passwords and other information that may be stored on computers in the network.

Intruders often invade a network for misappropriating data by gaining access to the network using information specific network devices and computers on the network. In one scenario, the intruder can "spoof" an IP or MAC address for a network device that has been granted access to certain network resources. Spoofing includes sending false identification information when requesting data from a repository on the network. Spoofing an IP or MAC address for a network device that is on a list of approved addresses can result in confidential information being sent on the network and being misappropriated by an intruder.

Intruders can often come into possession of IP and MAC addresses by randomly or systematically "pinging" IP and MAC address on a network. Pinging involves sending a request for a response from a device at a particular IP or MAC address. Pinging is used by network administrators and technicians to troubleshoot network connectivity problems. However, an intruder may use this same tool to discover valid IP and MAC address on a network which can then be used to spoof.

Some computer systems include an internal firewall such that the computer systems prevent the network device from responding to a ping except when that ping comes from a known or trusted source such as other network devices that are known to be on the network. These firewalls are fairly effective against random or systematic pinging by an intruder. Generally, however, these firewalls depend on software installed on the host computer that has the network device installed in it. Thus, the firewalls only prevent the network device from responding when the computer on which the network device is installed has been properly booted and logged into. If a computer on a network provides power to the network device, the network devices will generally respond to pings from any device, including one in use by an intruder, on the network. Appropriate correction is needed to prevent intruders form obtaining identification information about computers on a network by random and systematic attacks.

SUMMARY OF THE INVENTION

One embodiment of the invention includes a method of securing a network device installed on a host computer. The network device is initialized without transmit and/or receive functionality being enabled, thereby preventing the network device from communicating on the communications network. The network device, which may include a network device driver, then awaits receipt of an appropriate notification that the host has been authenticated. When such notification is received, transmit and receive functionality on the network device is enabled. By disabling network transmit and/or receive functionality, rogue clients cannot ping the network device. This allows the network device to initialize a firewall before communicating on a network.

In another embodiment of the invention, a network device is configured for improved security. The network device includes a network port for sending and receiving network information. The network device includes a module, which in one embodiment may be a software driver on a host computer, that disables transmit and receive functionality to the network port. Network and receive functionality may be enabled when the host computer on which the network device is installed is logged into, and appropriate firewall protection is initiated. This helps to prevent rogue computers from initiating attacks on the network by preventing the network device from responding to the rogue computers until appropriate protections have been implemented.

Embodiments of the invention may also be implemented as a network. The network includes clients that are configured with transmit and receive functionality disabled until the clients have been logged into, and appropriate security functions are enabled, such as a firewall. Once logged into and protection initiated, the clients will enable transmit and receive functionality for communication across the network.

These and other advantages and features of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF EXEMPLARY EMBODIMENTS

Embodiments of the present invention allow a network device to be configured in a manner so as to prevent malicious communications via an attacked communications network. For example, the transmit and/or receive functionality of the network device can be disabled until a host system on which the network device has been installed has authenticated a user, and invoked appropriate security functions. Without transmit and receive functionality, the network device cannot respond to pings sent by an intruder to discover information about the network device.

In one embodiment, once the host system has authenticated a user, the network device can update firewall policy information from a firewall policy server prior to allowing connections from any other servers or clients on the network. The firewall policy server is preferably an authenticated server so as to prevent a compromised or unauthorized policy server from delivering policy information that would allow an attack on clients on the network. The firewall policy information may be role based. Namely, when the host system authenticates a user, the user may belong to some group of users (role) such as administrators, executives, employees etc. The firewall policy information will have restrictions or permissions depending on which role the user belongs to. With firewall policy information in place on the network device, probing, such as pinging by an intruder, can be filtered out by a firewall on the network device using the firewall policy information.

Figure 1:
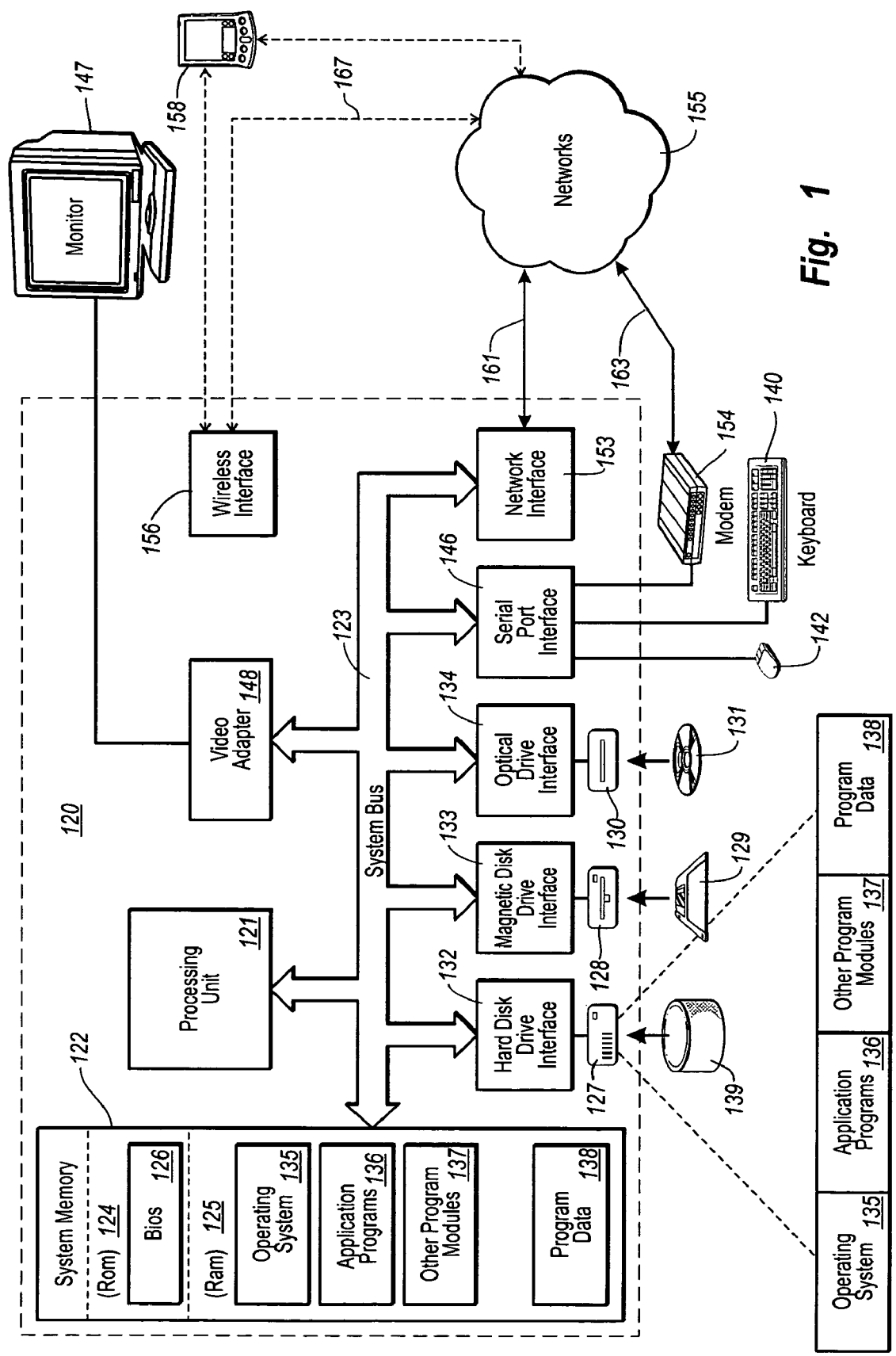
FIG. 1 illustrates an exemplary system that provides a suitable operating environment for the present invention.

FIG. 1 and the following discussion are intended to provide a brief, general description of an example of a suitable computing environment in which embodiments of the network device may be implemented. Although not required, embodiments may be described in the general context of computer-executable instructions, such as program modules, being executed by computers operating within network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that embodiments may be practiced in network computing environments with many types of computer system configurations, including personal computers, hand-held devices, mobile telephones, personal digital assistants ("PDAs"), multi-processor systems, microprocessor-based or programmable consumer electronics, network PCs, minicomputers, mainframe computers, and the like. The invention may also be practiced in distributed computing environments where local and remote processing devices are linked (either by hardwired links, wireless links, or by a combination of hardwired or wireless links) through a communications network and both the local and remote processing devices perform tasks.

With reference to FIG. 1, an example system for implementing embodiments of the invention includes a general-purpose computing device, one example of which is shown in the form of a conventional computer 120. Computer 120 includes a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and/or an optical disk drive 130 for reading from or writing to removable optical disk 131 such as a CD-ROM or other optical media. In this particular example, the magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Of course, other types of computer readable media for storing data can be used, including magnetic cassettes, flash memory cards, digital versatile disks, Bernoulli cartridges, RAMs, ROMs, and the like.

Program code means, comprising one or more program modules, may be stored on the hard disk 139, magnetic disk 129, optical disk 131, ROM 124 and/or RAM 125. Examples include an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a wireless interface, a parallel port, a game port, a universal serial bus (USB) and the like. A monitor 147 or another display device is also connected to system bus 123 via an interface, such as video adapter 148. In addition to the monitor, some computers may include other peripheral output devices (not shown), such as speakers and printers.

The computer 120 may be operatively connected to a networked environment, an example of which is designated in FIG. 1 as network 155. As is well known, network 155 may be used to connect computer 120 to other remote computers, which may be personal computers, servers, routers, network PCs, peer devices or other common network nodes, and typically include many or all of the elements described above relative to the computer 120. Examples of various logical connections to network 155 are depicted in FIG. 1 include a wireless network 167, a local area network (LAN) 161, and a wide area network (WAN) 163. Each of the logical connections 167, 161, 163 represents a different way for the computer 120 to connect to the network 155. The wireless network 167 may utilize radio frequencies, microwaves, infrared light, etc. to transmit signals via the wireless interface 156 to the network 155. The LAN 161 utilizes, for example, an Ethernet, a USB network, or a token ring network to transmit signals from the network interface 153 to the network 155. The WAN 163 utilizes a modem 154 to decode the signals and a standard telephone line, wireless telephone line, coaxial cable, or fiber optic cable to transmit the signals from the serial port interface 146 to the networks 155. Such networking environments are commonplace in office-wide or enterprise-wide computer networks, intranets and the Internet.

By way of example, the wireless interface 156 could be implemented as a short range radio transceiver that preferably utilizes low power radio frequencies to transmit information over relatively short distances. For example, the wireless interface could be implemented as a Bluetooth or an 802.11 transceiver module. In this way, the wireless interface 156 could be used to wirelessly connect the computer 120 to a wide range of external devices, computing devices, networks, etc. For example, a Bluetooth module may be connected to the computer 120 to allow for a wireless connection between the computer 120 and a PDA 158 similarly equipped with a Bluetooth module.

Figure 2:
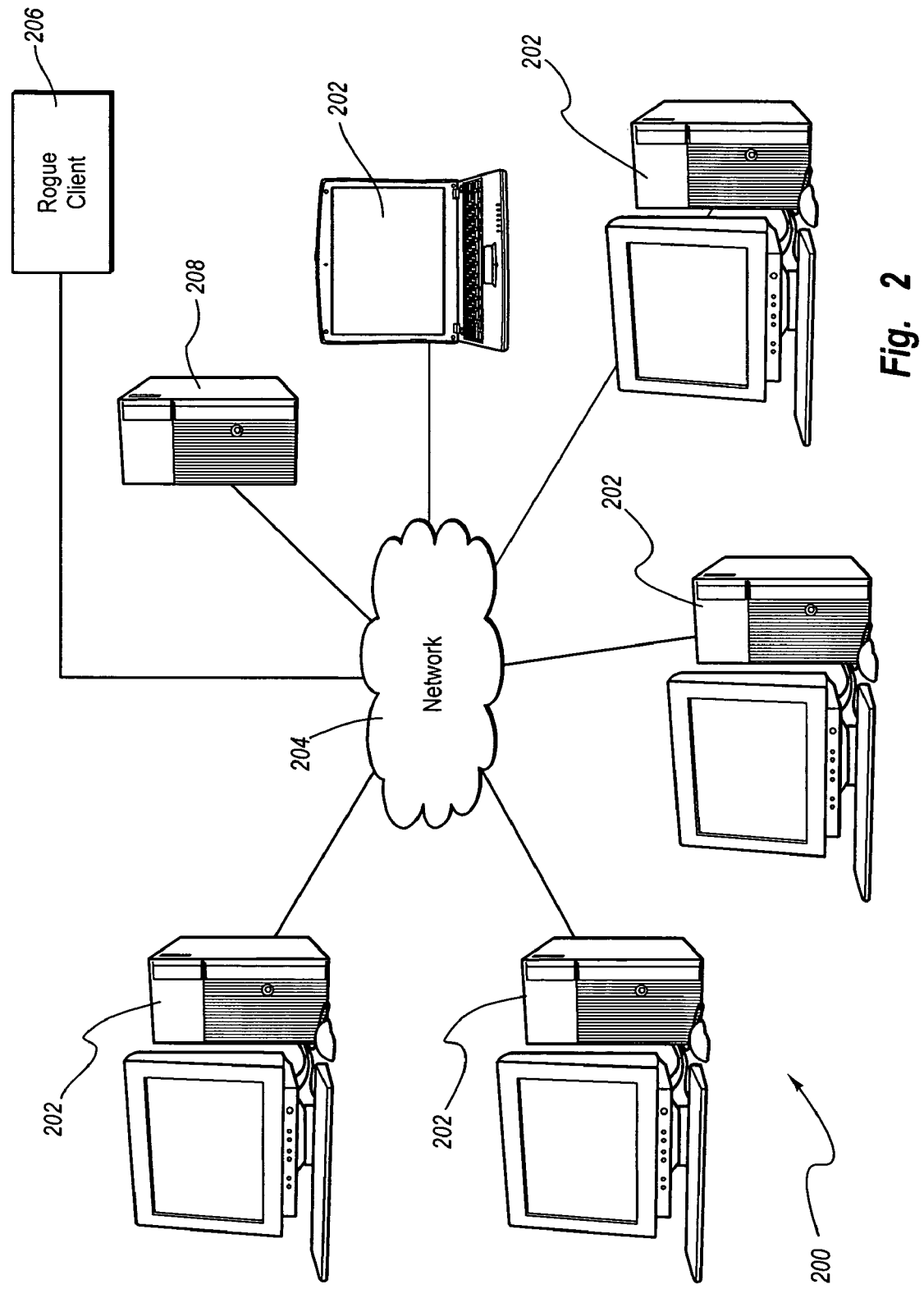
FIG. 2 illustrates a topology including computer clients connected to a network where embodiments of the invention may be practiced.

FIG. 2 illustrates one environment, namely a topology including a number of interconnected clients, where principles of the present invention may be practiced. It will be appreciated that the illustrated topology is for purposes of example only and should not be viewed as limiting of the present invention. For example other topologies could be used, as well as wired or wireless interconnection schemes. The illustrated topology 200 includes a number of clients 202 interconnected by a network 204. Each of the clients 202 may be in various states of operation. For example, a client 202 may be completely powered down, powered up but waiting for a user to log in or powered up and logged into by a user. A rogue client 206 in use by an intruder may be coupled to the network 204 where the intruder may attempt to gather information about the clients 202 on the network 204. For example, the rogue client 206 may send a ping, including IP address information, to the network 204. The network 204 routes this information to one of the clients 202 matching the IP information in the ping. The client 202, using principles of the present invention, is protected such that it does not respond to the ping when the ping is sent by a rogue client 206. When a client 202 is powered down, the client 202 will not respond to any pings or messages to the client 202. When a client 202 is powered up but waiting for a user to log in, the client 202 including network hardware on the client 202, may be initialized but with transmit and receive capabilities disabled. As such, a client 202 that is powered up but waiting for a user to log in is not able to receive or respond to pings from the rogue client 206. Some embodiments of the invention disable either receive or transmit (but not both) functionality of the client 202. In the example embodiment, client 202 that is powered up and logged into by a user has the network hardware enabled for transmit and receive.

Prior to initialization of the transmit and receive capabilities, the client 202 will access a policy server 208 to download firewall policy information for a firewall that may be installed on the client 202. Policy information from the policy server 208 may be used to prevent to the client 202 from communicating with a rogue client 206. In an alternative embodiment, the firewall policy information may be communicated to the client 202 by various other methods such as by being entered directly by a user at the client 202 on which a network device is installed or by other means. Preferably, the firewall policy information is stored in hardware on the network device. This provides a greater level of security over software based firewalls. Specifically, it is more difficult to tamper with firewall coding embedded in hardware than when the firewall is a software firewall running on a host computer on which a network device is installed. However, in alternative embodiments, the firewall policy may be implemented in software.

In one embodiment, the firewall policy information is specific to users depending on the users' role. For example, when a user logs into a host computer, the user is authenticated such as by comparing a username and password entered by the user. The username may be unique to a particular user. The username may be assigned to a particular role such as administrator, executive, employee, and the like. Each of these roles will have different permissions to access resources on a network or to allow access to the host computer. The firewall policy information may reflect this role based authentication.

Figure 3:
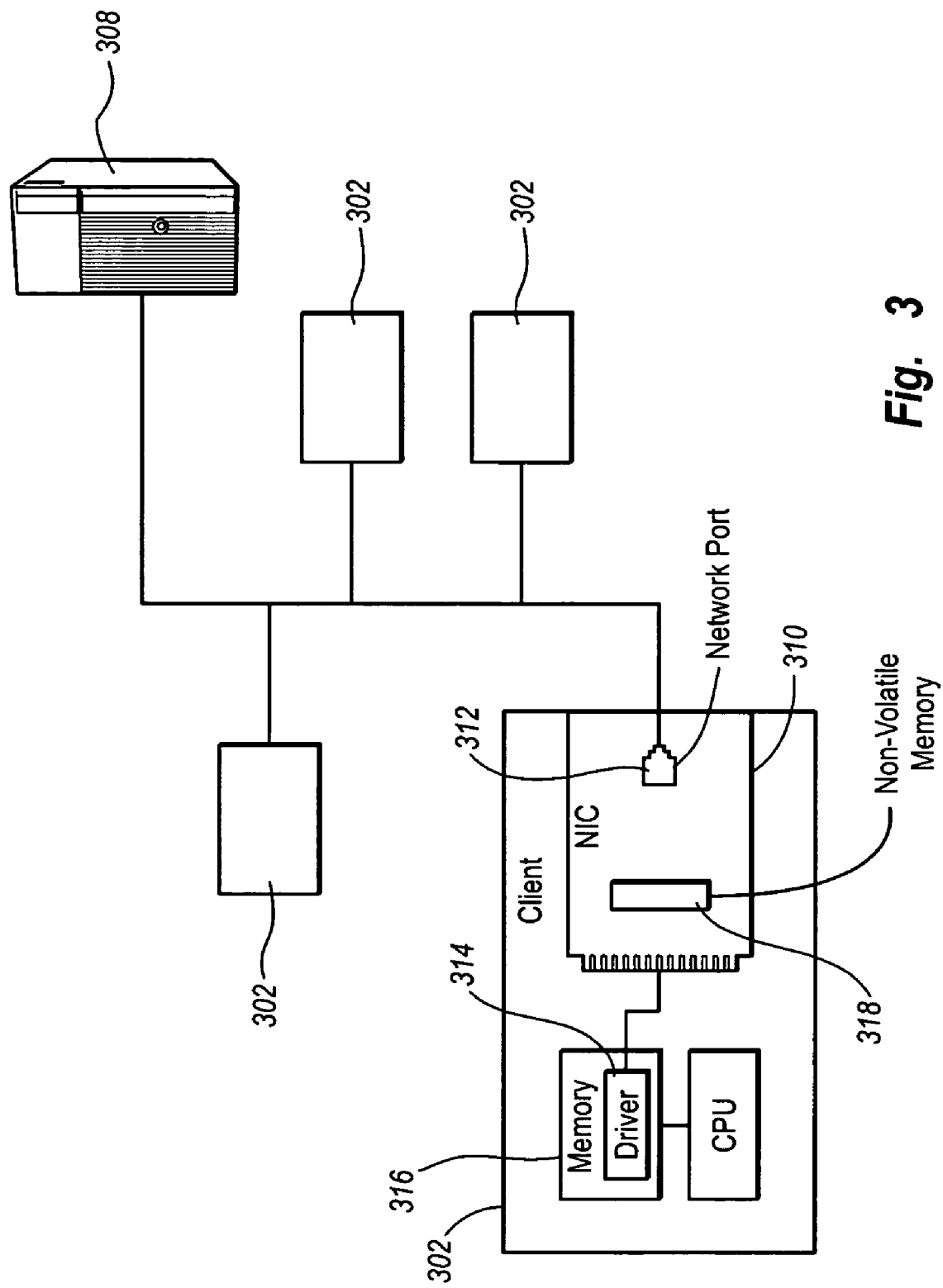
FIG. 3 illustrates a client implementing a network interface card.

Referring now to FIG. 3, the functionality of a hardware based firewall installed on a network interface card is illustrated. The client 302 includes a network device 310 for communicating on a network. In this example, the network device 310 is a 10/100 Ethernet card. More specifically, the network device 310 is a Secure CardBus network device including firewall and security features such as those available on part number 3CRFW103 available from 3Com Corporation of Marlborough, Mass. It will be appreciated that any one of a number of different network device implementations—including wireless—could be used.

The example network device 310 includes a network port 312. The network port 312 may be adapted to connect using RJ45 connectors, wireless communication, or other network connections, or a combination thereof. The network port 312 is configured to receive information from a network, including other peer clients 302, servers, or any other network device connected to the network. When the client 302 is powered on but not logged into by a user, the network device 310 may be initialized, but is done so in a manner so that transmit and receive capabilities are not enabled.

In the illustrated example, when a user logs on to the client 302, a network interface card driver 314 is loaded into the volatile memory 316, or similar memory location, of the client 302. In this example, the driver 314 controls the operation of the firewall on the network device 310, causing the network device 310 to contact a firewall policy server 308. The firewall policy server 308 may be, for example, a 3Com Embedded Firewall Policy Server part number 3CR010PS-1-97B available from 3Com Corporation of Marlborough, Mass., although other implementations could be used. The network device 310 retrieves firewall policy information from the firewall policy server 308. This firewall policy information is typically stored in nonvolatile memory 318 on the network device 310. The firewall policy information includes information of use to the firewall installed on the network device 310 including, for example, information about ports that should be blocked or clients that should be blocked. The firewall policy server 308 preferably includes authentication to ensure the integrity of any firewall policy information sent to clients on the network. For example, the firewall policy server 308 might present a valid identification and token before the network device 310 will accept firewall policy information from the firewall policy server 308.

Figure 4:
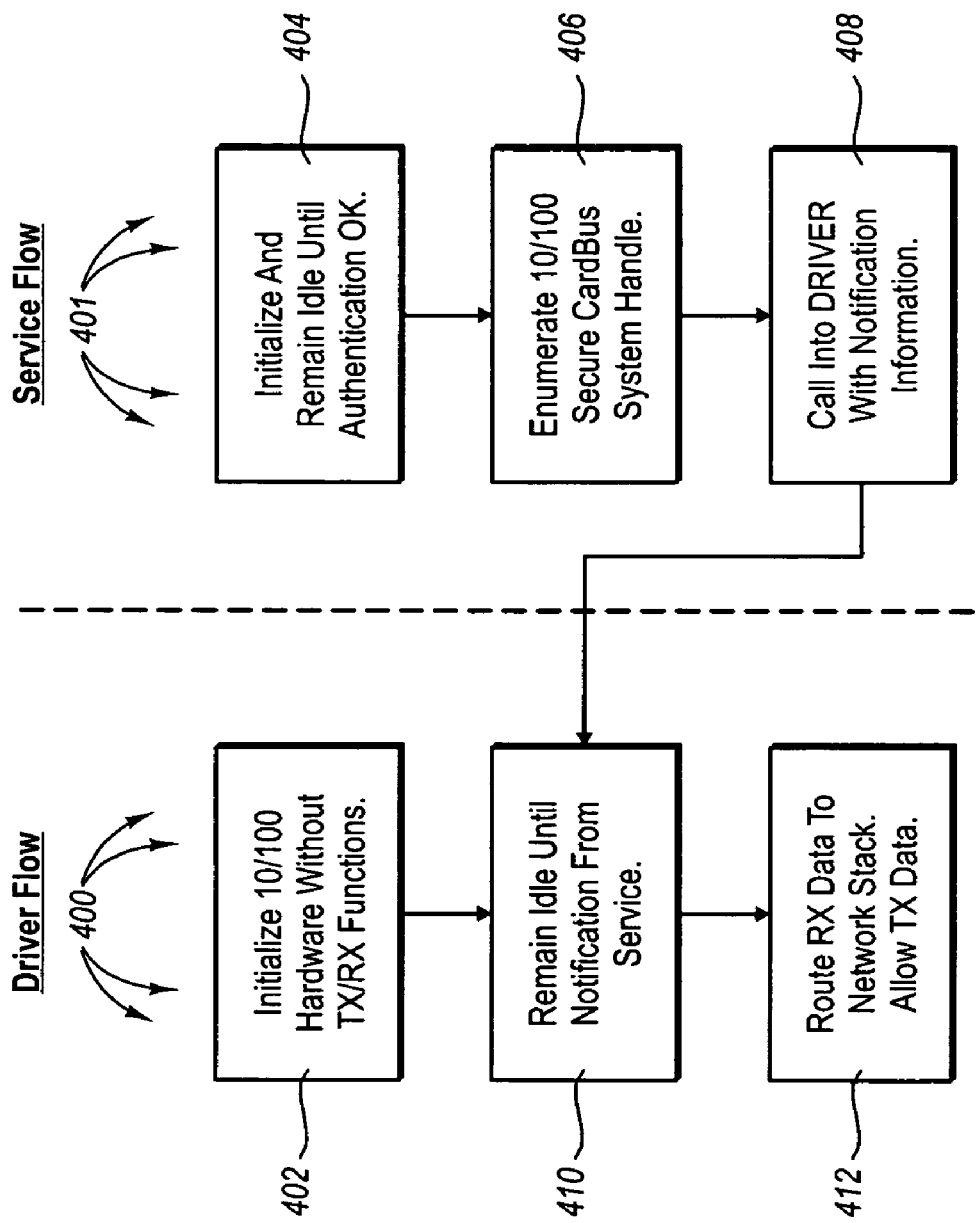
FIG. 4 illustrates exemplary flow controls that may be implemented in one embodiment of the present invention.

FIG. 4 illustrates an exemplary flow control for methods implementing principles of the present invention. Two flow controls are shown, namely a driver flow 400 and a service flow 401. The driver flow 400 illustrates steps that may be performed, for example, by a driver installed in memory of a host computer. The service flow 401 illustrates steps performed by an authentication service. The authentication service may also be installed as a computer program in memory on a host computer.

When a host system is powered on, the driver control initializes network hardware such as a network device 310 (402). Initializing the network hardware is performed such that transmit and receive capabilities of the network hardware are disabled. The driver flow then causes the network hardware to remain idle until notification is received from the service flow 401 (410).

Meanwhile, the service flow 401 initializes and waits for appropriate authentication (404). Authentication generally involves a user presenting an identification and a token. The identification designates the identity of a specific user. The token is an indicator provided by the user to confirm the user's identity. An exemplary identification is a username. An exemplary token is a password. Other types of identification and tokens may be used, such as smart cards, biometrics (e.g. fingerprints and retina scans), physical keys, etc.

When a user has been appropriately authenticated, the system flow enumerates the network hardware system handle (406). This provides the network device with a token or pointer for accessing the network device driver on a host system. The system flow then calls into the driver flow with notification information indicating to the driver flow that the host system has been authenticated (308).

When the driver flow 400 receives notification that the host system has been authenticated, the driver flow routes received data to the network stack and allows data to be transmitted from the network hardware (412), thus enabling the transmit and receive capabilities of the network hardware. In one embodiment of the invention, prior to receiving communications from any other client on the network, the host system will contact a firewall policy server. As described above, the firewall policy server provides policy information for the firewall on the network hardware.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method of securing a network interface device installed on a host computer comprising:

initializing, without transmit or receive functions for network communications, a network interface device installed on a host computer;

receiving, at the network interface device installed on the host computer, notification from the host computer on that a user has been authenticated to the host computer; and in response to receiving notification that the user has been authenticated to the host computer, enabling transmit and receive functions for network communications of the network interface device installed on the host computer.

2. The method of claim 1, further comprising accessing a firewall policy server to download firewall policy information that is used by a firewall on the network interface device after enabling transmit functions of the network interface device.

3. The method of claim 2, wherein accessing a firewall policy server is performed before transmitting or receiving data from any other clients or servers.

4. The method of claim 2, wherein accessing a firewall policy server comprises authenticating the firewall policy server.

5. The method of claim 2, wherein receiving notification that a user has been authenticated to the host computer includes receiving notification that the authenticated user is associated with a role, and wherein accessing a firewall policy server comprises downloading firewall policy information for the role.

6. The method of claim 2, further comprising receiving firewall policy information communicated to the host computer and using the firewall policy information at a hardware based firewall on the network interface device.

* * * * *

UNITED STATES PATENT AND TRADEMARK OFFICE
CERTIFICATE OF CORRECTION

PATENT NO. : 7,657,926 B1  Page 1 of 1
APPLICATION NO. : 10/804927
DATED : February 2, 2010
INVENTOR(S) : Steven T. Baker It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1002 days.

Signed and Sealed this

Thirtieth Day of November, 2010

David J. Kappos
*Director of the United States Patent and Trademark Office*